United States Patent [19]

Cooper et al.

[11] 4,362,829

[45] Dec. 7, 1982

[54] POLYCARBONATES STABILIZED WITH SULFOLANE DERIVATIVES

[75] Inventors: Stephen M. Cooper; Sheldon J. Shafer, both of Pittsfield, Mass.; John A. Tyrell, Mt. Vernon, Ind.

[73] Assignee: General Electric Company, Mt. Vernon, Ind.

[21] Appl. No.: 296,542

[22] Filed: Aug. 26, 1981

[51] Int. Cl.$^3$ .............................................. C08K 5/45
[52] U.S. Cl. ..................... 524/84; 524/126; 524/128; 528/176; 528/196
[58] Field of Search ........................................... 524/84

[56] References Cited

U.S. PATENT DOCUMENTS 2,435,071  1/1948  Evans et al. ........................ 524/84
2,451,299 10/1948  Morris et al. ...................... 524/84
2,810,728 10/1957  Beesley et al. ..................... 524/84
3,407,140 10/1968  Chiddix et al. .................... 524/84
3,734,799  5/1973  Schaffer et al. ................... 524/84

Primary Examiner—John Kight, III
Assistant Examiner—R. A. White
Attorney, Agent, or Firm—Martin B. Barancik; William F. Mufatti

[57] ABSTRACT

A composition comprising an aromatic carbonate polymer in admixture with an effective thermal stabilizing amount of a compound of formula

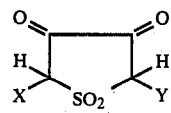

5 Claims, No Drawings

POLYCARBONATES STABILIZED WITH SULFOLANE DERIVATIVES

BACKGROUND OF THE INVENTION

Stabilizers of aromatic carbonate polymers have long been known in the art. Of particular interest is the concept of thermal stabilization of aromatic carbonate polymers.

General injection molding of these polymers exposes the material to high temperatures. In addition many of the utilities of the polymers require long term exposure to elevated temperatures. The integrity of the molecule should be retained for as long as possible since the physical characteristics are dependent thereon. Various chemicals such as phosphites and phosphonites have been in common usage as thermal stabilizers for aromatic carbonate polymers.

A new class of thermal stabilizers for aromatic carbonate polymers has been discovered.

SUMMARY OF THE INVENTION

In accordance with the invention there is a composition which comprises an aromatic carbonate polymer in admixture with an affective amount of a thermally stabilizing compound of the formula

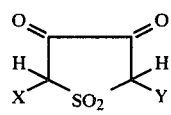

Formula I wherein X and Y are the same or different and are phenyl or naphthyl said phenyl or naphthyl unsubstituted or substituted with one to three members of the group consisting of alkyl of one to three carbon atoms, inclusive, alkoxy of one to three carbon atoms, inclusive, chlorine or bromine.

A preferred compound is where X and Y are both phenyl.

DETAILED DESCRIPTION OF THE INVENTION

It should be noted that the compound of Formula I is represented as a diketo compound. Tautomers of this compound exist in the enol form as pictured below where one or both of the keto groups is present in its enol form. The exact composition of keto and enol will vary according to the environment but it is to be understood that the Formula I compound includes its tautomers of Formula II.

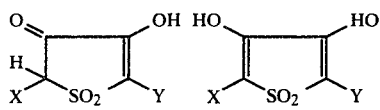

Formula II

As used in this specification and claims the phrase "phenyl or naphthyl substituted with one to three members of the group consisting of alkyl of one to three carbon atoms, inclusive, alkoxy of one to three carbon atoms, inclusive, chlorine and bromine" includes 2-tolyl; 2,4-dimethylphenyl; o-cumyl; 2-methoxyphenyl; 2-ethoxy-3-ethylphenyl; 2,4,6-trichlorophenyl; and 2-methyl-4-propoxy-5-bromophenyl; 3-chloronaphthyl-1.

The polymer, to which an effective amount of the thermally stabilizing compound of Formula I is added, is prepared in the conventional manner by an interfacial polymerization process or a transesterification process. The process materials will be illustrated with the reactants commonly employed in the interfacial polymerization process although it is to be understood that suitable reactants can be employed in the transesterification process to provide the same aromatic carbonate polymer.

Typical of some of the dihydric phenols that may be employed in the practice of this invention are bisphenol-A, (2,2-bis(4-hydroxyphenyl)propane), 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis 4-hydroxyphenyl sulfone and bis 4-hydroxyphenyl sulfide. Other dihydric phenols of the bisphenol type are also available and are disclosed in U.S. Pat. Nos. 2,999,835; 3,028,365 and 3,334,154. Bisphenol-A is preferred.

It is, of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di(halophenyl)carbonates such as di-(chlorophenyl)carbonate, di-(bromophenyl)carbonate, di-(trichlorophenyl)carbonate, di-(tribromophenyl)carbonate, etc., di-(alkylphenyl)carbonate such as di(tolyl)carbonate, etc., di-(naphthyl)carbonate, di-(chloronaphthyl)carbonate, phenyl tolyl carbonate, chlorophenyl chloronaphthyl carbonate, etc., or mixtures thereof. The haloformates suitable for use herein include bis-haloformates of dihydric phenols such as BPA and hydroquinone, or glycols (bishaloformates of ethylene glycol, neopentyl glycol, polyethylene glycol, etc.). While other carbonate precursors will occur to those skilled in the art, carbonyl chloride, also known as phosgene, is preferred.

The polymers of this invention may be prepared by employing a molecular weight regulator, an acid acceptor and a catalyst. The molecular weight regulators which can be employed in carrying out the process of this invention include monohydric phenols such as phenol, chroman-1, paratertiarybutylphenol, parabromophenol, etc. Commonly, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor includes a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethylammonium bromide, tetra-n-heptylammonium iodide, tetra-n-propyl ammonium bromide, tetramethylammonium chloride, tetramethylammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pryomellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Also included within the definition of aromatic carbonate polymer are so-called copolyester carbonates. These compounds have both ester ($CO_2$) and carbonate ($CO_3$) repeating units. These compounds are generally prepared from the reaction of dihydric phenols, dicarboxylic acid precursors and a carbonate precursor. The preferred aromatic carbonate polymers are synthesized from bisphenol-A, terephthaloyl dichloride, isophthaloyl dichloride, and phosgene.

The compounds of Formula I are made by conventional methods as disclosed in Chaykovsky, et al, J. Org. Chem., 37, 1972 (2018).

Illustrative examples of compounds of Formula I which are useful as thermal stabilizers of aromatic carbonate polymers are disclosed in the Chart, attached to the specification. X and Y are the same variables as in Formula I.

A thermal stabilizing effective amount of the compound of Formula I is added to the aromatic carbonate polymer. A "thermal stabilizing effective amount" is a quantity of the compound which inhibits the deterioration of the aromatic carbonate polymer when it is subjected to a thermal treatment. Such deterioration is measured by conventional parameters such as intrinsic viscosity (I.V.) upon heating. A control aromatic carbonate without any compound of Formula I is employed as the comparison base. In order to be an effective amount, the quantity of compound employed should not cause significant deterioration of the subject polymer and be physically compatible with it. Generally, quantities of compound of from about 0.005 to about 5 weight percent based on the quantity of aromatic carbonate polymer, preferably 0.01 to about 0.5 weight percent are appropriate.

It is preferred that the additive remains physically present during the processing of the polymer. Although the boiling point of the additive may be significantly lower than the processing temperature, the bulk of the additive may stay within the polymer during processing because of its intermingling with the polymer below the surface of the flowing material. It is important that the quantity of additive present in the polymer during and after the thermal processing produces a thermal stabilizing effect.

The compound is added to the aromatic carbonate polymer in the conventional manner, for example by co-extruding with dry resin or by adding the compound polymer to the solution or melt.

Below are specific examples of the invention. These examples are intended to illustrate but not to limit the concept of the invention.

EXAMPLE 1

Polycarbonate prepared from BPA and diphenyl carbonate in a transesterification process, and having an intrinsic viscosity of 0.455 was aged for 16 hours at 250° C. The I.V. dropped to 0.251. Co-extrusion of this polycarbonate with 0.07% 4-hydroxy-3-oxo-2,5-diphenyl-2,3-dihydrothiophene-1,1-dioxide provided a polycarbonate that was thermally stabilized after aging at 250° C. for 16 hours.

EXAMPLE 2

In like manner as in Example 1 appropriate quantities of compounds from the Chart are added to the aromatic carbonate polymer and similar results are obtained.

CHART

| X | Y |
|---|---|
| phenyl | phenyl |
| phenyl | 4-ethylphenyl |
| 2-chlorophenyl | 3,4-dibromophenyl |
| 3,4-dimethoxyphenyl | 4-t-butylphenyl |
| phenyl | naphthyl |
| naphthyl | naphthyl |
| 3,4-dimethylphenyl | 3,4-dimethylphenyl |

What is claimed is:

1. A composition which comprises an aromatic carbonate polymer in admixture with an effective amount of a thermal stabilizing compound of the formula

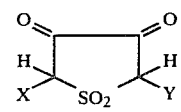

Formula I wherein X and Y are the same or different and are phenyl or naphthyl unsubstituted or substituted with one to three members of the group consisting of alkyl of one to three carbon atoms, inclusive, alkoxy of one to three carbon atoms, inclusive, chlorine and bromine.

2. A composition in accordance with claim 1 wherein X and Y are phenyl.

3. A composition in accordance with claim 1 wherein a compound of Formula I is present in the admixture in quantities of from about 0.005 to about 5 weight percent of the aromatic carbonate polymer.

4. A composition in accordance with claim 1 wherein a compound of Formula I is present in the admixture in quantities of from about 0.01 to about 0.5 weight percent of the aromatic carbonate polymer.

5. A composition in accordance with claim 1 wherein the aromatic carbonate polymer is derived from bisphenol-A and a carbonate precursor.

* * * * *